United States Patent [19]

Punj

[11] Patent Number: 5,289,579
[45] Date of Patent: * Feb. 22, 1994

[54] CHANNEL ADAPTER FOR BROADBAND COMMUNICATIONS AT CHANNEL SPEEDS

[75] Inventor: Vikram Punj, Naperville, Ill.

[73] Assignee: AT&T Bell Laboratories, Murray Hill, N.J.

[*] Notice: The portion of the term of this patent subsequent to Jul. 27, 2093 has been disclaimed.

[21] Appl. No.: 928,137

[22] Filed: Aug. 11, 1992

Related U.S. Application Data

[63] Continuation of Ser. No. 414,032, Sep. 28, 1989, abandoned.

[51] Int. Cl.$^5$ .......................... H04Q 11/04; G06F 5/06
[52] U.S. Cl. ..................................... 395/200; 370/60; 370/94.1; 370/110.1
[58] Field of Search ........................................ 395/200

[56] References Cited

U.S. PATENT DOCUMENTS

| | | | |
|---|---|---|---|
| 4,969,147 | 11/1990 | Markkula, Jr. et al. | 370/94.1 |
| 5,231,631 | 7/1993 | Buhrke et al. | 370/60 |

OTHER PUBLICATIONS

"IBM Channel-To-Channel Adapter", IBM Product Description Document SA22-7091-0, Jun. 1983.
"IBM 3088 Multisystem Channel Communication Unit Product Description", IBM Product Description Document GA22-708-1, 1982.
"3737 Remote Channel-To-Channel Unit", IBM Product Description Document R006453, Jun. 1987.
"3737 Remote Channel-To-Channel Unit, Description and Installation Planning Guide", IBM Product Description Document GA18-2716-0, Jun. 1987.
P. A. Evans, Review of Version D.0 of proposed IEEE Standard 802.6 (DQDB MAN), (Memo to Members of IEEE 802.6 Working Group), Jun. 26, 1988, pp. 1-63 and 15 unnumbered pages.
R. Sinha, T1S1, Technical Sub-Committee, Broadband Aspects of ISDN, Baseline Document (Draft), Jul. 1988, pp. 1-30.

*Primary Examiner*—Kevin A. Kriess
*Assistant Examiner*—John Q. Chavis
*Attorney, Agent, or Firm*—Werner Ulrich

[57] ABSTRACT

This invention relates to methods and apparatus for interfacing between computer channels and a Broadband Integrated Services Digital Network (B-ISDN) in order to allow such channels to communicate with a large number of other channels over the long distances and large bandwidth provided by B-ISDN. In a terminal adapter, channel addresses are translated into network addresses and channel format data is converted into B-ISDN format data in order to allow data messages between channels to be transmitted over the B-ISDN network.

16 Claims, 5 Drawing Sheets

CHANNEL ADAPTER FOR BROADBAND COMMUNICATIONS AT CHANNEL SPEEDS

This application is a continuation of application Ser. No. 414,032, filed on Sep. 28, 1989, now abandoned.

TECHNICAL FIELD

This invention relates to arrangements for communicating between computers over a broadband data network.

BACKGROUND OF THE INVENTION

Computer channels are the arrangements used by some computers such as IBM and IBM clone computers to communicate with other computers, peripheral equipment such as storage devices, and input/output devices such as terminals and printers. One such set of channels is defined by a standard known as the FIPS 60 standard defined by the National Bureau of Standards and operates at speeds of 3, 4.5, and eventually 6 megabytes per second. In the past, such high speed channels have been connected to low speed data networks. However, with the introduction and standardization of broadband integrated services digital network (B-ISDN) facilities such as those defined by CCITT and the IEEE 802.6 standard for metropolitan area networks, it becomes possible to transmit data at data channel rates over a data network. The B-ISDN network is described in "Broadband Aspects of ISDN-T1S1 Technical Subcommittee", Document T1S1.1/88-333, published by American National Standards Institute (1988), and the 802.6 network is described in "Project 802-Local and Metropolitan Area Networks Proposed Standard", prepared by the IEEE 802.6 Working Group, Jun. 26, 1988. A channel addresses a maximum total of 256 subchannel addresses and each address terminates on a device or software subsystem in a host computer. Arrangements exist for interconnecting 8 or 16 host channels using a Multisystem Channel Communication Unit (MCCU). The subchannel addresses are distributed among the potential destinations in accordance with information stored in a read only memory, initialized all installation time, defined within the MCCU. Thus in a case of a MCCU serving 8 channels, each channel may communicate with any other channel or device over 32 different subchannel addresses. With the use of MCCU, each sending channel sends data on a particular address within a range of addresses dedicated to that sending channel. This address is converted in the MCCU to a corresponding address for addressing the desired channels and, in some cases, an associated device. A problem with this type of unit is that it can only be used for accessing other channels or devices within typically 400 feet of the MCCU. The channels are therefore limited to being within 800 feet of each other. The requirement to pass state information from each channel for every subchannel address to each interacting channel on a given subchannel address, sufficiently rapidly to minimize the occurrence of "glare", wherein two ends of a communication between subchannels both generate "read" or "write" commands simultaneously, with small effect on performance due to this overhead, restricts this distance in the prior art. The current limitations include an overall throughput limitation to the bandwidth of 2 or 4 busses within the MCCU, and a limit of only 2 or 4 simultaneous conversations are possible between the 8 or 16 interconnected channels.

Other disadvantages of the MCCU are that it is not user programmable, i.e., it is set up in the factory using firmware to define the particular configuration for which it is being used. The MCCU arrangement limits each connected channel to a single communication at any one time and further limits the entire system to two or four simultaneous communications because of the presence of a shared bus within the MCCU. A channel has the ability to send to multiple destinations simultaneously; however, since the MCCU is a non-buffered device, it does not allow the channel to transmit until a data path is available, so that multiple transfers from over the same physical path and a channel cannot take place in the prior art.

In another arrangement in the prior art for communicating over long distress, computer channels are interconnected over a 1.5 megabit/second digital carrier facility. This arrangement is limited in bandwidth to the bandwidth provided by the digital carrier and is limited to connecting only the two channels at the endpoints of the carrier facility. There is therefore no provision for switching data blocks concurrently to more than one other channel.

While such high speed computer channels can be used advantageously for communications between two computers, or computers to devices or, in some cases, to a small group of such devices, the availability of B-ISDN facilities makes it possible for computers to communicate with a large number of other computers over a broadband network at channel speeds. However, there are no arrangements in the prior art which permit such connection. Further, a great deal of computer software is written on the assumption that computer channels communicate directly with other computer channels. The "handshake" arrangement for establishing connections between computer channels assumes that another channel is connected.

A problem of the prior art therefore is that there are no economically attractive arrangements whereby computer channels can communicate at high speeds with a large number of other computers or devices.

SUMMARY OF THE INVENTION

In accordance with the apparatus and method of this invention, an advance is made over the prior art by connecting a channel to a terminal adapter for converting device addressing information to network terminal information and converting the data to be transmitted from channel format into a format suitable for transmission over a high speed data network to the desired terminal device. Arrangements are provided for maintaining in each interface to the network information concerning the state of subchannels connected to the network. In one specific implementation of applicant's invention, the data network is a broadband network, the transmission rate of each of whose facilities is approximately 150 megabits per second in conformance with the CCITT standards for B-ISDN networks and IEEE 802.6 standard for metropolitan area networks. Advantageously, such an arrangement: permits communication at channel rates among all the computers and other devices connected to the data network; removes the distance restriction; permits multiple simultaneous communications to take place; increases the number of end points from 16 to 256; and permits users to change the mapping of subchannel addresses. State information for each subchannel, including availability of a subchannel address, can be transmitted over a B-ISDN or 802.6 network in a sufficiently short time without concern for consuming bandwidth and with low latency. This makes it possible to separate the channels by a distance much greater than the 800 foot limit. Because data moves through a broadband network many times faster than through prior art networks, it is now possible to spend a little extra time to synchronize channels that are widely separated without adversely affecting the time to process a transaction, thus satisfying software and user service levels.

In accordance with one aspect of the invention, the terminal adapter stores messages prior to forwarding them to either the network or the channel. Computer channels are used to communicate between "devices", such as printers, discs, tape units or software systems within a computer. Advantageously, this storage permits the function of waiting for the availability to be performed in the terminal adapter without forcing the software of the device and the firmware of the channel to be aware of the possible unavailability of a device at the distant end of the data network. Advantageously, by passing subchannel state information from end to end, the terminal adapter provides the same "handshake" to the associated channel that would otherwise be provided from another channel. This allows the channels to be separated by much more than 800 feet. The glare situation can occur here with similar commands (read-read or write-write) being issued simultaneously. The terminal adapter has a mechanism based on a predetermined priority for one end to break the glare possibility.

In one specific implementation of applicant's invention, the input to the terminal adapter is in the format of the (Federation of Information Processing Societies) FIPS 60 channel and the output is a signal for use with a B-ISDN network. The format at the layer 1 level is essentially that defined by the CCITT standard for the asynchronous transfer mode (ATM) described in the previously referenced T1S1 document. At the layer 2 level the format is essentially that of LAPD (link access protocol D) or other layer 2 protocols such as IEEE 802.2. At the higher layers, the format is similar to a protocol such as Transmission Control Protocol/Internet Protocol (TCP/IP) that provides reliable data transfer, flow control, the ability to multiplex several communications on a data link, software definable windows and timers with a minimum of processing overhead.

In accordance with one aspect of the invention, each terminal adapter attached to the network can transmit and/or receive multiple simultaneous data packets limited primarily by the bandwidth of the data network facility connected to the terminal adapter. The channels connected to the device are arranged to handle block multiplexing so that even though at one instant only one communication enters or leaves a channel over a period of time, data associated with up to 255 different communications may enter and leave a channel. This facility is known as a block multiplexer facility which allows a channel to be treated either as one single high speed communication or as a plurality of lower speed communication facilities. Each channel is limited to 256 subchannels.

In accordance with another aspect of the invention, the 256 subchannels of each channel may be used in any arrangement for communicating with any device attached to the network. Advantageously, the system can be arranged so that a small number of high speed communications can be used to interconnect each device with other devices connected to the network or a large number of low speed communications may be so used or any mixture of the two.

DETAILED DESCRIPTION

Figure 1:
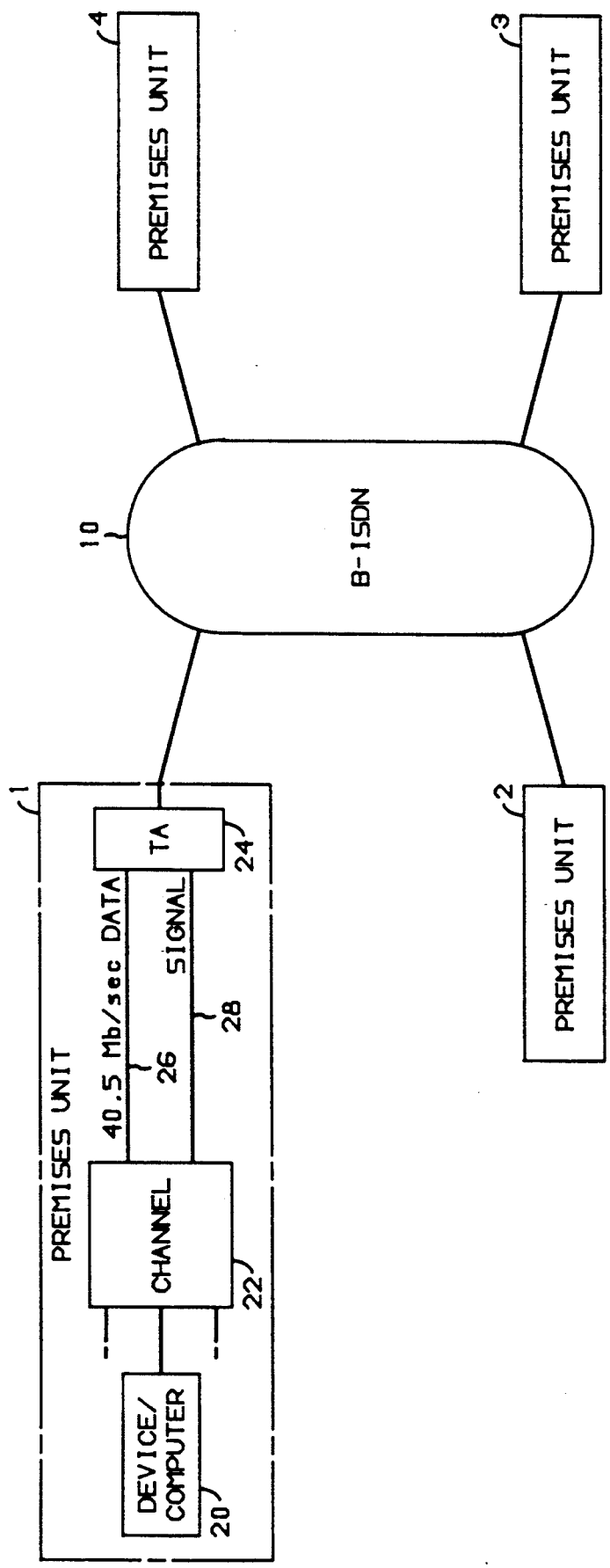
FIG. 1 is a block diagram illustrating transmission of data over a B-ISDN network.

FIG. 1 is a basic block diagram of a B-ISDN network 10 which communicates with a plurality of premises units 1,2,3,4. Each premises unit comprises a device 20 such as a computer or a peripheral device such as a disk drive, video terminal concentrator, tape drive, etc. One or more such devices are connected to a channel 22 which acts as a data communication interface for the device. The channel is connected to a terminal adapter 24 by a one-half duplex data communication, each direction operating at 40.5 megabits per second (4.5 megabytes per second, each byte comprising 8 information bits and one parity bit). Two types of messages are exchanged between the channel and the terminal adapter, signaling messages for signaling changes of state or requests for changes of state from and to the channel 22, and data messages. The data is actually transmitted over the network at 36 megabits per second because the 9th bit on each byte (a parity bit) is eliminated before transmission over the network. In alternate configurations, a 27 megabit or 54 megabit per second data rate between the channel and terminal adapter can be used.

Figure 2:
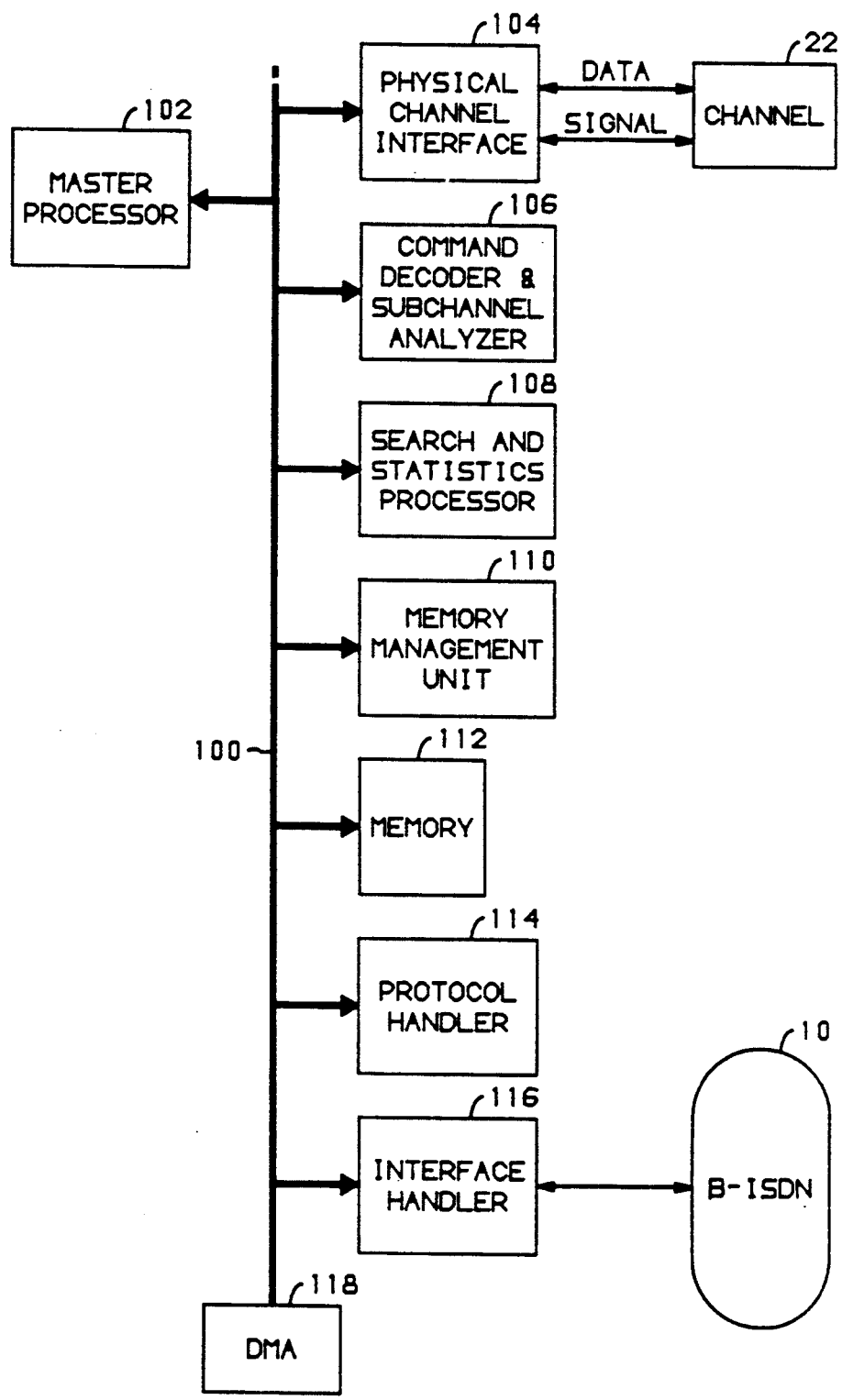
FIG. 2 is a detailed block diagram of a terminal adapter for interfacing between a computer channel and a B-ISDN network.

The details of the terminal adapter 24 are shown in FIG. 2. A bus 100 is used to interconnect a plurality of processors. Master processor 102 arbitrates the use of the bus among the other processors. It has overall control and performs the operations, administration, and maintenance control for the terminal adapter. The physical channel interface is a microcode driven processor for providing the electrical interface to the channel via the signaling connection and the data connection. It takes data from the channel and via the bus 100, transfers this data through the memory management unit 110 to memory 112. It also accepts data from memory management unit 110 for transmission to channel 22. Upon receipt of signals from the channel, it transmits these signals over the bus 100 to command decoder and subchannel analyzer 106. The command decoder and subchannel analyzer can be a conventional program controlled processor and need not be bit sliced processor or microcode driven processor. The command decoder also sends commands from the remote channel for changes of state over bus 100 via physical channel interface 104 to the channel 22. The command decoder and subchannel analyzer 106 also maintains a state table of the local state of each subchannel and the state of the remote subchannel with which this subchannel is communicating. The search and statistics processor 108 is used for making conversions between the addresses used for the channel units and the addresses used for packets on the B-ISDN network. It changes addresses from the format used in the channel to the format required for addressing B-ISDN terminals. It also collects and reports statistical measurements concerning the B-ISDN and channel traffic from and to a particular premises unit.

The search and statistics processor 108 also makes a search to find the terminating terminal adapter address corresponding to the specified subchannel address and finds the addresses appropriate for use in the virtual X.25 channel that has been established between the source process and the terminating process and the virtual link.

Because of the need to synchronize state machines at both channels, and the greater distance separating the channels, it is possible to have a "glare" situation when two host computers are communicating. This may happen, for example, if two host computers are both issuing a write command each to the other computer. Under these circumstances, it is necessary that one of the two computers be defined at system initialization time on that particular subchannel address to have priority over the other. When a channel, for example, issues its write command, each terminal adapter signals to the other terminal adapter that a write command has been issued and waits an appropriate time (in this specific implementation, 1.25 milliseconds) before indicating to the channel that the write command may be executed. During this time, it checks to receive either a write-okay signal or to receive a write command from the other computer. If the write-okay command is received then the write process can proceed as planned. If, during this time interval, a write command from the other computer is received, then if this is the channel with priority, that command is ignored. If this is the channel without priority, the remote command is accepted and the local channel is told to execute a read command. During the 1.25 millisecond interval or prior to receipt of an okay signal, a flag is maintained in the command decoder and subchannel analyzer to indicate that the local state has not yet been finalized and that a request is pending from the remote side. This subject is discussed further with respect to flow chart blocks 514–520 of FIG. 5.

The search and statistics processor 108 also maintains a table identifying for each subchannel the present value of the virtual data link and virtual data channel associated with that subchannel and also the virtual signaling link and virtual signaling channel used for setting up communications over the corresponding virtual data link and virtual data channel. The memory management unit processor 110 is used to assign blocks of memory for the storage of data to be transmitted from the terminal adapter and data received in the terminal adapter. The memory management unit maintains a linked list of available blocks of memory and assigns blocks of memory as needed for receiving data either from the channel or from the network and transmitting data to either the channel or the network. It also manages the maintenance of inverted lists of all addressing data. Processor 114 is a protocol handler for converting the channel format to the X.25 format required by the B-ISDN network 10, converts between the B-ISDN format and the channel format, and breaks down messages into packets of the length appropriate for B-ISDN transmission. Protocol handler 114 uses the table of FIG. 3 to translate between a subchannel address and the identity of the corresponding virtual data link and virtual data channel, values that are needed for the X.25 or other protocol format. Protocol handler 114 also maintains the state machines necessary for handling communications with the B-ISDN network at layer 2 and layer 3. Interface handler 116 performs the layer 1 functions for interfacing with the B-ISDN network 10. It takes data prepared by protocol handler 114 in the X.25 format and assembles appropriate cells for transmission in accordance with the ATM format required by the B-ISDN network. Interface handler 116 also controls the fiber optic interconnection to the B-ISDN network. A direct memory access unit 118 is attached to the bus interconnecting all the processors with the memory and is used for controlling all memory accesses from the bus.

Figure 3:
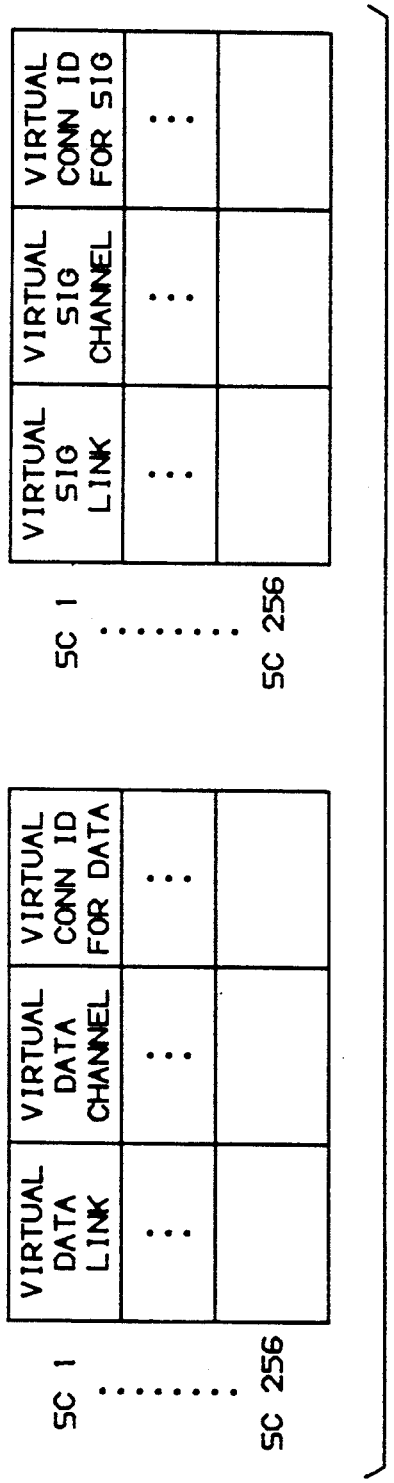
FIGS. 3 and 4 are diagrams of tables of the terminal adapter.

FIG. 3 contains two associated tables for translating between a subchannel number and virtual data link and virtual data channel as used in the LAPD and X.25 protocols and virtual channel identifier for data as used in the ATM protocol for the B-ISDN signaling. A corresponding table is used for the signaling channel links and virtual connections. In this system separate virtual channels are used for the signaling and the data to allow signaling packets to be transmitted with lower delay than data packets. By giving signaling messages priority, guard intervals can be reduced to a minimum and the time required for establishing communications reduced substantially. The signaling channels are arranged so that if packets cannot be transmitted quickly, they are discarded. The penalty for a discarded signaling packet is relatively low, since the software is prepared for loss of such packets. On the other hand, for data packets, where the recovery cost for the loss of a data packet is relatively high because of the amount of data that must be retransmitted, delays are more tolerable but every attempt is made to avoid discarding packets. Hence, data cells have high loss priority and low delay priority.

Figure 4:
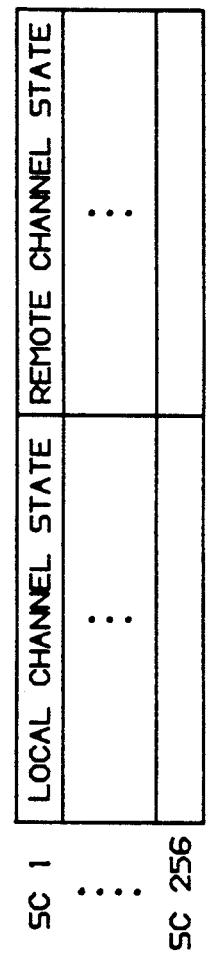

FIG. 4 is a table used primarily by the command decoder and the subchannel analyzer which records the state of the local channel and the state of the corresponding remote channel. The state of the local channel is updated in memory whenever an appropriate command is received from the local channel. The remote channel state is update in response to command messages received over the signaling channel from the remote device or host. Every command received from the local channel is converted into a corresponding signaling message to inform the remote channel so that the state of the remote channel in the state table of the remote unit can be updated. Actions such as accessing the remote host or device can only be performed when both the local channel state and the remote channel state have the appropriate complementary values. For instance, a read command in the local channel state must be matched with a write command in the remote channel state.

Figure 5:
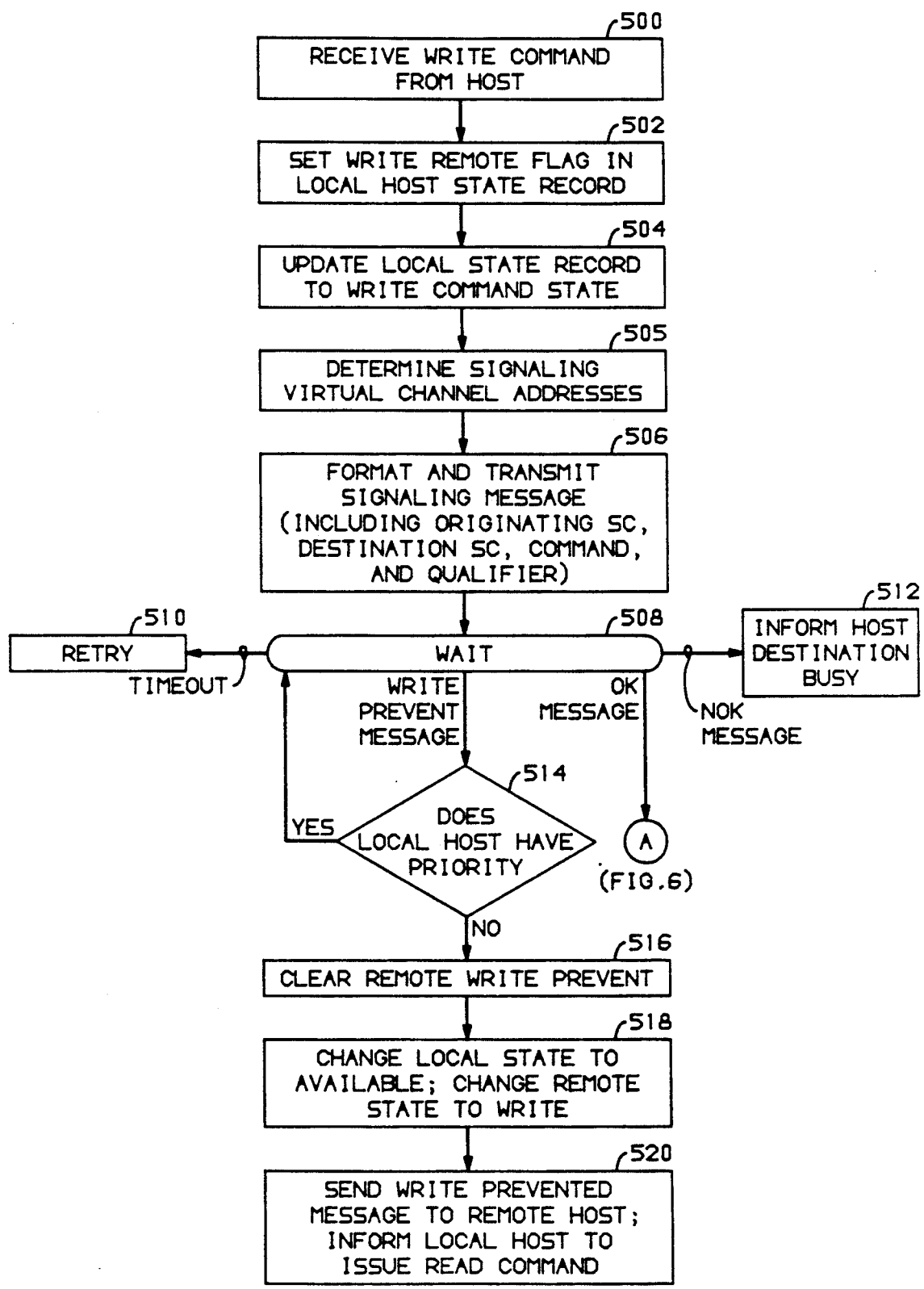
FIGS. 5 and 6 are flow diagrams of the operation of a terminal adapter.
Figure 6:
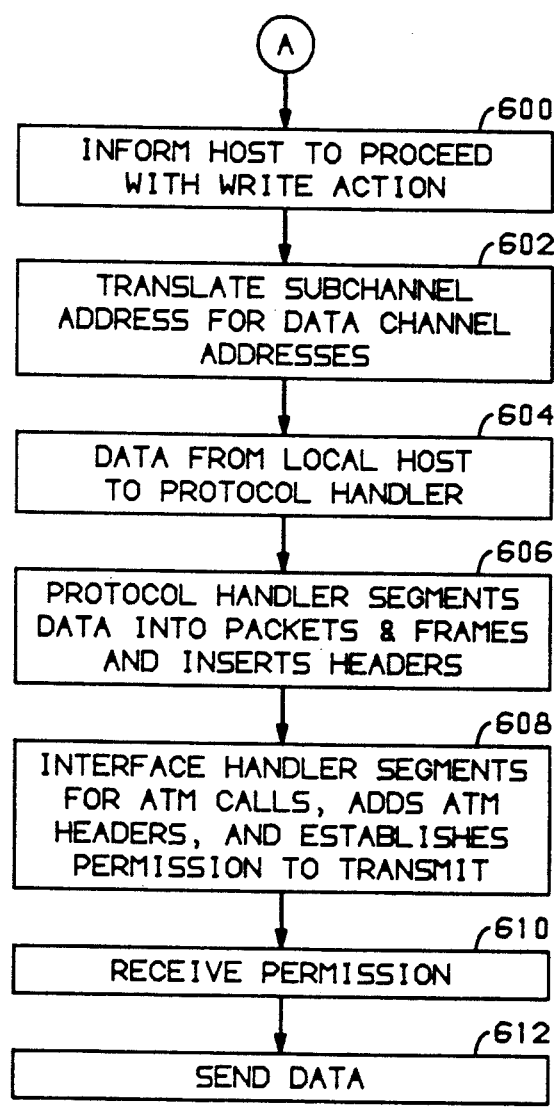

FIGS. 5 and 6 illustrate the steps performed in executing a write action from a host to a remote device when a session is first beginning, i.e., the first of a series of write commands. The terminal adapter receives a write command from its associated host over the channel (action block 500). The terminal adapter sets a write-remote flag in the local state record (action block 502) for the corresponding subchannel. As discussed infra with respect to action blocks 514–520, this is to prepare for a possible "glare" condition wherein two channels try to write to each other simultaneously over the same subchannels. The local channel state for the corresponding subchannel is updated to the write command state (action block 504). The identity of the virtual signaling channel, virtual signaling link, and virtual connection identifier for signaling are determined for that subchannel (action block 505) in the search and statistics processor. The write prevent command signaling message is formatted and transmitted by the protocol handler and interface handler using these virtual addresses (action block 506). The write command address includes the identification of the orginating signaling channel, destination signaling channel, the write command and a qualifier which for this message is blank. The terminal adapter then enters a wait state (action block 508) during which it waits for one of four events. If none of the other three events occurs before a timeout after a 1.25 millisecond interval, then a new attempt is made to send out the write command (action block 510) or the terminal adapter turns its attention to the next subchannel address needing attention. If a negative okay message is received, then the host is informed that the destination is unavailable (action block 512). If a write-prevent message is received, this represents the condition wherein the destination host is also trying to write into the source host at the same time and the conflict must be resolved. Test 514 is used to determine whether the local host has priority over the remote unit. If so, then the write-prevent message is ignored and the terminal adapter goes back into the wait state. If the local host does not have priority, then the remote write-prevent flag is cleared (action block 516). The local state is changed to available and the remote state is changed to write (action block 518). A write-prevented message is then sent to the remote machine (action block 520). The TA then causes the local channel to issue a Read command to complement the Write request from the remote end.

If an okay message is received in response to the write command, then the actions shown in FIG. 6 are performed. First the terminal adapter informs the host to proceed with the write action (action block 600). The host, then the terminal adapter translates the subchannel address to find the addresses for the virtual data link, virtual data channel and virtual connection identifier for data. These addresses are used in the headers used in transmitting the data over the network. The data is received from the local host over the channel and is passed to the protocol handler of the terminal adapter (action block 604). The protocol handler segments data into packets and frames and inserts the link layer and network layer headers (action block 606). The interface handler then segments the packets and frames received from the protocol handler into ATM cells and adds ATM headers for transmission over the B-ISDN network and establishes permission to send over that network (action block 608). When permission to transmit is received (action block 610) the data is sent over the B-ISDN network to the remote host (action block 612).

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. A first terminal adapter for interfacing between a first computer channel, comprising a plurality of subchannels, and a data network for interconnecting a plurality of terminals; said first terminal adapter for communicating data in both directions, on a peer-to-peer basis wherein peers can autonomously change states, with a second terminal adapter over a virtual channel of said data network, said plurality of subchannels each having a subchannel address; said first terminal adapter connectable to a first terminal of said data network, said data network having a plurality of network terminals each having a network address; said first terminal adapter being used for communicating over said network from a first subchannel of said first computer channel over said network to a second terminal of said network, said second terminal connected to said second terminal for adapter for interfacing between said second terminal and a second computer channel including a second subchannel; said first terminal adapter comprising:

means for recording state information for said first and said second subchannels, for ensuring that a state of said first subchannel corresponds to a record of a state of said second subchannel and for assigning a virtual channel address for a communication between said first and said second subchannels;

means, responsive to said means for recording, for translating from an address of said first subchannel to said virtual channel address and said second terminal address; and means for formatting data from said first subchannel for transmission over said network and for including said virtual channel address and said second terminal address in data packets for transmission over said network to said second subchannel;

wherein said means for recording and ensuring comprise means for initiating a communication from a first subchannel connected to said first terminal adapter to a second subchannel connected to the second terminal adapter, said means for initiating comprising:

means for checking in a record of the state of said second subchannel as maintained in said first terminal adapter whether the recorded state is a proper state for accepting communications and means for transmitting a request message to request said second terminal adapter to place said second subchannel in a receiving state;

means responsive to a first type of response message from said second terminal adapter for deferring said communication; and means responsive to a second type of response message from said second terminal adapter for initiating said communication.

2. The first terminal adapter of claim 1 further comprising:

means for storing said data from said first subchannel while awaiting availability of said second subchannel.

3. The first terminal adapter of claim 2 wherein the means for recording, means for translating, means for formatting, and means for storing each comprise means for recording, translating, formatting and storing, respectively, for a plurality of computer channels.

4. An adapter for interfacing between a computer channel, comprising a plurality of subchannels, and a data network, said adapter for communicating on a peer-to-peer basis with other adapters and their interfaced computer channels, comprising:

processor means, operative under program control, for controlling operations of the adapter;

memory means for storing data received from the channel and received from the network;

protocol handler means for processing header data of packets received from the computer channel and processing header data of packets received from the network;

wherein said processor means is operative under said program control for translating from a subchannel address for packets received from the computer channel to a virtual channel address and an address of a terminal of said data network and from a virtual channel address for packets received from the network to a subchannel address of a computer channel connected to said adapter;

network interface means responsive to first outputs of the protocol handler means representing data transmitted from the computer channel for generating first data signals for transmission over the network;

channel interface means responsive to second outputs of the protocol handler means representing data received from the network for generating second data signals for transmission over the channel; and command decoder and subchannel analyzer means for maintaining a state of each subchannel connected to the adapter and each remote subchannel not connected to the terminal adapter with which each connected subchannel is communicating, said decoder and analyzer means for detecting simultaneous attempts to execute the same command, and upon detecting said simultaneous attempts, abandoning an attempt from a terminal adapter connected to a subchannel having a precoded lower priority.

5. The adapter of claim 4 wherein said processor means further comprises:

memory management means for allocating blocks of memory of the memory means to packets of data being received from the network and the computer channel; and master processor means for allocating virtual channels to messages for transmission from the channel.

6. A method of transmitting data between a first and a second computer channel, the channels using a channel protocol for transmitting data messages between peer communicating entities, the channels having first and second input/output subchannels, respectively, connected to first and second terminal adapters, respectively, and each of the terminal adapters being connected to a data network using a network protocol for transmitting data messages comprising the steps of:

establishing a data transmission virtual circuit between the first and the second subchannel of the first and second channels, respectively;

transmitting a data message over the first subchannel to the first terminal adapter;

converting the data message into the protocol of the data network in the first terminal adapter;

transmitting the data message from the first terminal adapter to the second terminal adapter over the virtual circuit;

converting the received message into the channel protocol in the second terminal adapter; and transmitting the converted data message to the second computer over the second subchannel;

wherein the establishing comprises synchronizing states of the first and second subchannels in the first and second terminal adapters for transmitting a data message between the first and second subchannels by performing the steps of:

transmitting a first signaling message from the first terminal adapter to the second terminal adapter over a pre-established signaling virtual circuit, the message comprising a command to synchronize a first subchannel state of the second terminal adapter to a corresponding state of the first terminal adapter, the states for allowing transmission between the first and second subchannels, the first signaling message comprising data identifying a data message virtual circuit; and responsive to reception of the first signaling message, establishing the corresponding state in the second terminal adapter and sending a positive acknowledgment message to the first terminal adapter.

7. The method of claim 6 wherein the data network is a broadband integrated services digital network (B-ISDN) and wherein the first converting step comprises the step of:

converting the data message into a B-ISDN formal message.

8. The method of claim 6 wherein establishing a virtual circuit further comprises the steps of:

recognizing a glare situation wherein a write request from the second terminal adapter for the first subchannel is received in the first channel adapter after a write request for the second subchannel has been sent from the first terminal adapter; and responsive to said recognizing, if the first channel adapter has a predefined lower priority indicator for transmission of data between the first and second subchannels, over the data transmission virtual circuit, canceling the write request from the first adapter and issuing a read request to the first subchannel.

9. The method of claim 6 wherein establishing a virtual circuit further comprises:

receiving a message from the second terminal adapter that the second channel is unavailable; and responsive to receipt of the unavailability message, marking the second channel unavailable in the first terminal adapter and informing the first subchannel of the unavailability;

whereby if a channel becomes unavailable between the time a request is initiated and a response is received, the establishing step is deferred.

10. The method of claim 6 wherein said state information comprises unavailability data, wherein the step of establishing a virtual circuit comprises:

prior to transmitting the first message, testing whether the second channel is unavailable; and if the testing step indicates that the second channel is unavailable, deferring the establishing step.

11. The method of claim 6 further comprising:

if the second subchannel is unavailable, storing the data message in the first terminal adapter prior to transmitting the message to the second terminal adapter.

12. The method of claim 6 wherein each of the channels has a common defined protocol further comprising:

communicating between the first channel and the terminal adapter using the common defined protocol.

13. The method of claim 6 wherein said terminal adapter comprises a network interface with a predetermined bandwidth further comprising:

transmitting a plurality of messages over a plurality of virtual circuits from a plurality of channels attached to the first terminal adapter up to a limit of the bandwidth of the transmitting network interface of the first terminal adapter.

14. The method of claim 6 wherein the establishing step is performed responsive to receipt of a write command from the first channel.

15. The method of claim 6 wherein establishing a virtual circuit comprises:

responsive to receipt of a write command from a channel, setting a write remote flag for a device that transmitted the write command over the channel;

sending a signaling message to a destination terminal adapter comprising an identification of a sending subchannel, receiving subchannel and write command; and receiving a positive acknowledgment from the destination adapter.

16. The method of claim 6 wherein the step of transmitting the data message from the first terminal adapter to the second terminal adapter comprises the step of transmitting the data message using a protocol that ensures error-free data transmission.

* * * * *

UNITED STATES PATENT AND TRADEMARK OFFICE
CERTIFICATE OF CORRECTION

PATENT NO. : 5,289,579
DATED : February 22, 1994
INVENTOR(S) : Vikram Punj

It is certified that error appears in the above-indentified patent and that said Letters Patent is hereby corrected as shown below:

Title page, item [57], col. 2, line 7, Notice, delete "2093" and insert--2010--.

Signed and Sealed this

Second Day of January, 1996

Attest:

BRUCE LEHMAN

*Attesting Officer*    Commissioner of Patents and Trademarks